United States Patent
Van Lear

(10) Patent No.: US 8,235,351 B1
(45) Date of Patent: Aug. 7, 2012

(54) SHOCK LOAD ISOLATION MOUNTING

(75) Inventor: Brian T. Van Lear, Hastings, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 435 days.

(21) Appl. No.: 12/548,852

(22) Filed: Aug. 27, 2009

(51) Int. Cl.
  *F16M 1/00* (2006.01)
  *F16M 11/00* (2006.01)
  *F16M 3/00* (2006.01)
  *F16M 5/00* (2006.01)
  *F16M 7/00* (2006.01)
  *F16M 9/00* (2006.01)

(52) U.S. Cl. ........ 248/638; 248/562; 248/576; 248/566; 248/603; 248/636; 267/35; 267/64.11

(58) Field of Classification Search .................. 248/638, 248/562, 576, 566, 603, 636; 267/35, 220, 267/64.11, 64.15, 64.23
See application file for complete search history.

(56) References Cited

U.S. PATENT DOCUMENTS

| | | | | | |
|---|---|---|---|---|---|
| 3,772,627 | A | * | 11/1973 | Wilk et al. | 336/197 |
| 4,831,476 | A | * | 5/1989 | Branc et al. | 360/99.15 |
| 5,121,898 | A | * | 6/1992 | Yasuda et al. | 248/550 |
| 5,425,531 | A | * | 6/1995 | Perrault | 267/180 |
| 5,689,919 | A | * | 11/1997 | Yano | 52/167.6 |
| 6,021,991 | A | * | 2/2000 | Mayama et al. | 248/550 |
| 6,102,418 | A | * | 8/2000 | Runkel | 280/124.106 |
| 6,402,219 | B1 | * | 6/2002 | Hopf et al. | 296/70 |
| 6,416,016 | B1 | * | 7/2002 | Welsh | 244/54 |
| 6,443,416 | B1 | * | 9/2002 | Jones | 248/550 |
| 6,493,062 | B2 | * | 12/2002 | Tokuda et al. | 355/53 |
| 6,801,010 | B2 | * | 10/2004 | Zhang et al. | 318/611 |
| 6,874,248 | B2 | * | 4/2005 | Hong et al. | 34/239 |
| 7,114,710 | B2 | * | 10/2006 | Motz | 267/123 |
| 7,246,785 | B2 | * | 7/2007 | Monson et al. | 248/638 |
| 7,856,916 | B2 | * | 12/2010 | Anderson | 89/44.02 |
| 2004/0232307 | A1 | * | 11/2004 | Nemoto et al. | 248/638 |

* cited by examiner

*Primary Examiner* — Terrell McKinnon
*Assistant Examiner* — Michael McDuffie
(74) *Attorney, Agent, or Firm* — Hamre, Schumann, Mueller & Larson, P.C.

(57) ABSTRACT

A shock load isolation mounting system that incorporates a dashpot into each shock load isolation mount to provide damping. Each shock load isolation mount includes a shock mount portion having a first end fixed to the object to be isolated from shock loads, a second end, and an intermediate section between the first end and the second end. Each isolation mount also includes a dashpot mounted in series with the shock mount portion. The dashpot includes a moveable piston and a cylinder that receives the piston therein. The piston is fixed to the second end of the shock mount portion, and the cylinder is fixed to a support that is fixed relative to the object so that the dashpot provides damping in directions parallel to compression and tension directions of the shock mount portion.

10 Claims, 3 Drawing Sheets

SHOCK LOAD ISOLATION MOUNTING

This invention has been made with Government support under Contract Number FA8726-08-C-0008, awarded by the Joint Tactical Radio System (JTRS) Joint Program Office. The Government has certain rights in the invention.

FIELD

This disclosure relates to shock isolation mounts and isolating objects from exposure to shock loads.

BACKGROUND

The use of elastomeric or spring-type mounts to isolate objects from shock loads is known. However, elastomeric and spring-type mounts provide little or no damping.

SUMMARY

A shock load isolation mounting system is described that incorporates a dashpot into each shock load isolation mount to provide damping. The described system can be used with any object(s) that one wishes to isolate from shock loads. One exemplary application described herein is in isolating electronic equipment disposed within a cabinet.

In one example, a system includes an object subject to shock loads, and a plurality of shock load isolation mounts connected to the object. Each shock load isolation mount includes an elastomeric shock mount portion having a first end fixed to the object, a second end, and an intermediate section between the first end and the second end. The elastomeric shock mount portion is deformable in compression, tension and shear. Each isolation mount also includes a dashpot mounted in series with the elastomeric shock mount portion. The dashpot includes a moveable piston and a cylinder that receives the piston therein. The piston is fixed to the second end of the elastomeric shock mount portion, and the cylinder is fixed to a support that is fixed relative to the object so that the dashpot provides damping in directions parallel to the compression and tension directions of the elastomeric shock mount portion.

Since the dashpot is mounted in series with the elastomeric shock mount portion, the dashpot is not acted upon until the elastomeric shock mount portion experiences a large force. Further, since the cylinder of the dashpot is fixed relative to the object, the dashpot provides damping only in the directions parallel to the compression and tension directions upon movement of the piston, which is connected to the second end of the elastomeric shock mount portion, within the cylinder. The dashpot also provides some spring force to contribute to the spring force provided by the elastomeric shock mount portion.

The shock mount portion is not limited to being elastomeric. Other types of shock mount portions including, but not limited to, coil springs and wire rope springs, could be used in addition to or in place of elastomeric shock mount portions.

In another example, a shock load isolation mounting system for electronics equipment needing shock load isolation includes a plurality of shock load isolation mounts connected to the electronics equipment. Each shock load isolation mount includes a shock mount portion having a first end fixed to the electronics equipment, a second end, and an intermediate section between the first end and the second end, where the shock mount portion is deflectable in any direction. Each shock load isolation mount also includes a dashpot mounted in series with the shock mount portion. The dashpot includes a moveable piston and a cylinder that receives the piston therein. The piston is fixed to the second end of the shock mount portion, and the cylinder is fixed relative to the electronics equipment in x, y and z directions, and the dashpot provides damping in directions parallel to the x direction shown in FIG. 1.

DRAWINGS

DETAILED DESCRIPTION

Figure 1:
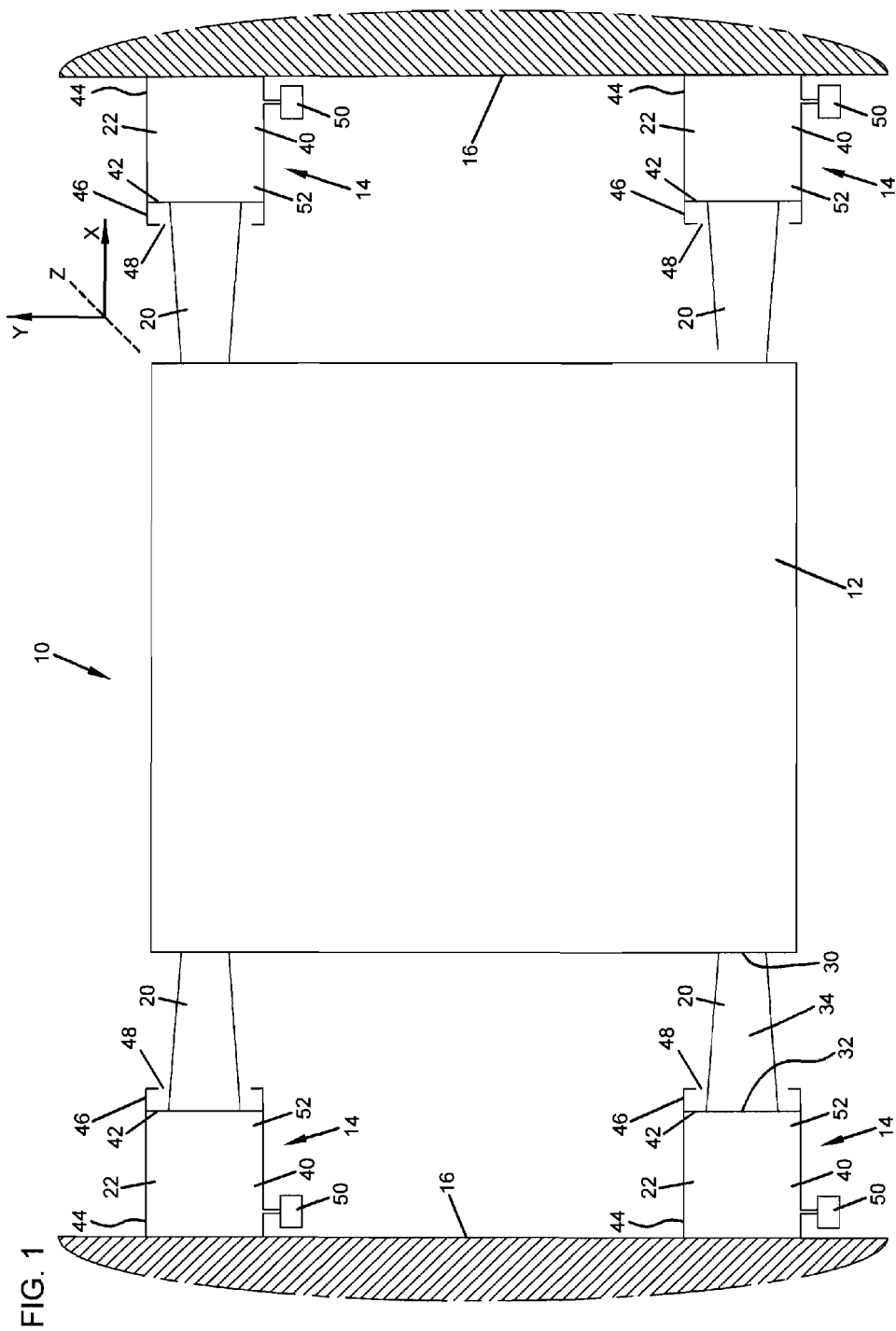
FIG. 1 illustrates an example of a shock load isolation mounting system described herein.

In FIG. 1, a shock load isolation mounting system 10 includes an object 12 to be isolated from shock loads, and a plurality of shock load isolation mounts 14 that support the object 12 relative to support structure 16. The object 12 is any object that is subject to shock loads and which it is desired to isolate from the shock loads.

For example, the object 12 can be electronics equipment such as, but not limited to, that used on a ship, such as a military vessel, and the support structure 16 can be a cabinet that houses the electronics equipment. FIG. 1 can be considered to be a side view of the electronics equipment with the shock load isolation mounts 14 connected to side walls of the electronics equipment and to walls (i.e. support structure 16) forming the cabinet. Alternatively, FIG. 1 could be considered a top view with the shock load isolation mounts 14 connected to side walls of the electronics equipment and to walls (i.e. support structure 16) forming the cabinet. In either event, the electronics equipment is isolated from shock loads by the plurality of shock load isolation mounts 14.

The shock load isolation mounts 14 are substantially identical to each other and include a shock mount portion 20 and a dashpot 22 mounted in series with the shock mount portion. The shock mount portion 20 is intended to provide a spring force with little or no damping. The dashpot 22 is intended to provide damping and, given the nature of dashpots, provides a spring force as well. Since the dashpot is placed in series, it will not be acted upon until the shock mount portion 20 experiences a large force.

The shock mount portion 20 includes a first end 30 that is fixed to the object 12, a second end 32, and an intermediate section 34 between the ends 30, 32. The shock mount portion 20 is formed so that it is deflectable in any direction to accommodate compression, tension and shear forces. The shock mount portion 20 can be, for example, an integral one-piece elastomeric shock mount, a coil spring, a wire rope, or any other type of shock mount that provides a spring force with little or no damping.

The dashpot 22 comprises a cylinder 40 and a piston 42 that is fixed to the second end 32 of the shock mount portion 20. The piston 42 is disposed within the cylinder 40 and is moveable therein as in a conventional dashpot. The cylinder 40 has one end 44 that is fixed to the support structure 16 so that the cylinder is fixed in the x, y and z directions relative to the object 12. The opposite end 46 of the cylinder includes an opening 48 through which the intermediate section 34 of the shock mount portion 20 extends. The opening 48 accommodates lateral deflections (i.e. shear movements) of the intermediate section 34 of the shock mount portion, and the opening 48 is preferably made large enough so that the intermediate section 34 does not come into contact with the cylinder through all anticipated deflections of the intermediate section.

Even though the cylinder 40 is fixed, the piston 42 is moveable within the cylinder in directions parallel to the x direction (i.e. parallel to compression and tension directions of the shock mount portion), to provide damping in directions parallel to the compression and tension directions in case of significant compression and tension forces acting on the shock mount portions 20. To dissipate energy, the dashpot 22 can include a fluid reservoir 50, shown symbolically, in communication with a fluid chamber 52 of the dashpot defined between the end 44 and the piston 42. As would be understood by a person of ordinary skill in the art, energy is dissipated by the transfer of fluid between the reservoir 50 and the chamber 52 upon alteration of the volume of the chamber 52.

Figure 2:
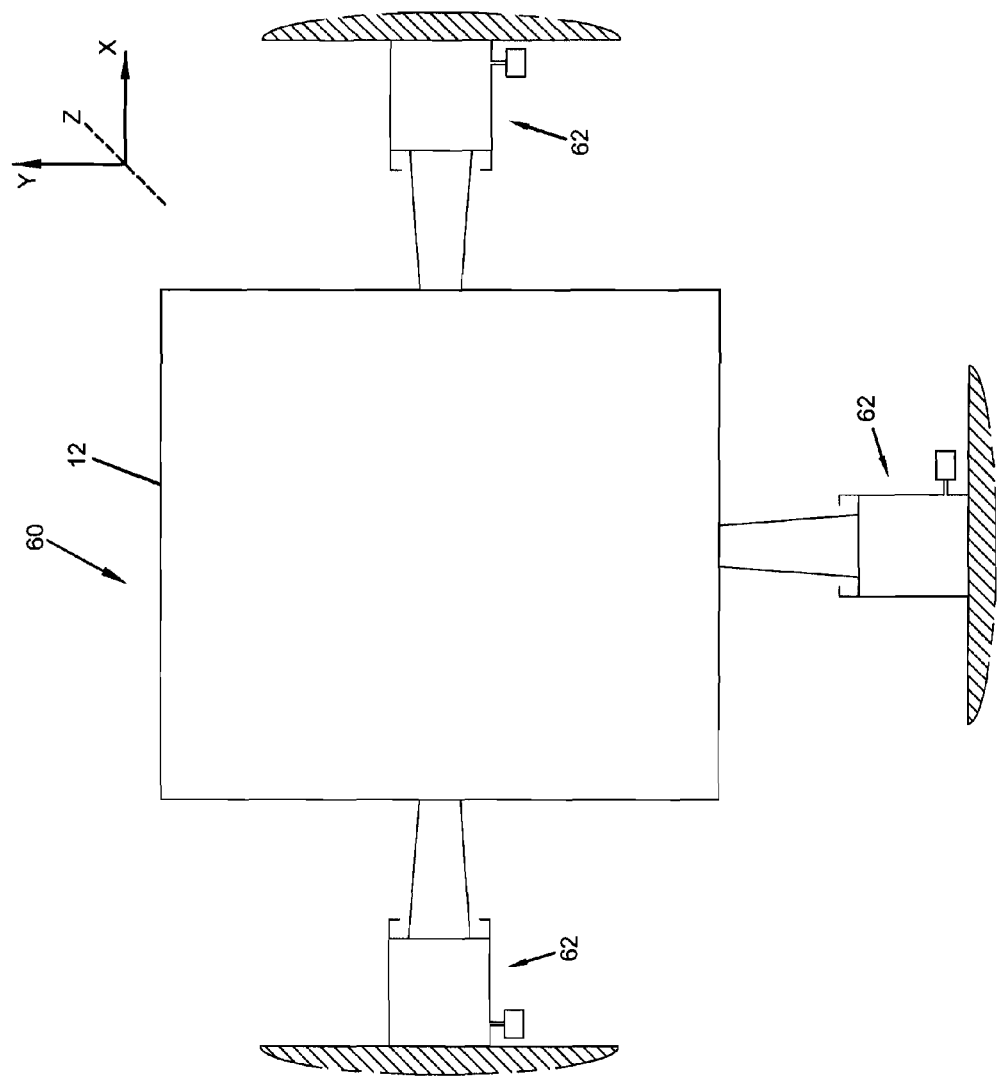
FIG. 2 illustrates another example of a shock load isolation mounting system described herein.

While FIG. 1 shows the shock load isolation mounts 14 connected to sides of the object 12, other mount locations are possible. For example, FIG. 2 illustrates a shock load isolation mounting system 60 where the object 12 is supported on its sides and at its bottom by one or more shock load isolation mounts 62. The mounts 62 are substantially similar to the mounts 14 with a shock mount portion and a dashpot. In this example, the object 12 is supported from its sides as well as at its bottom so that shock isolation and damping is provided in all directions. One or more shock load isolation mounts can be attached to the top of the object as well.

Figure 3:
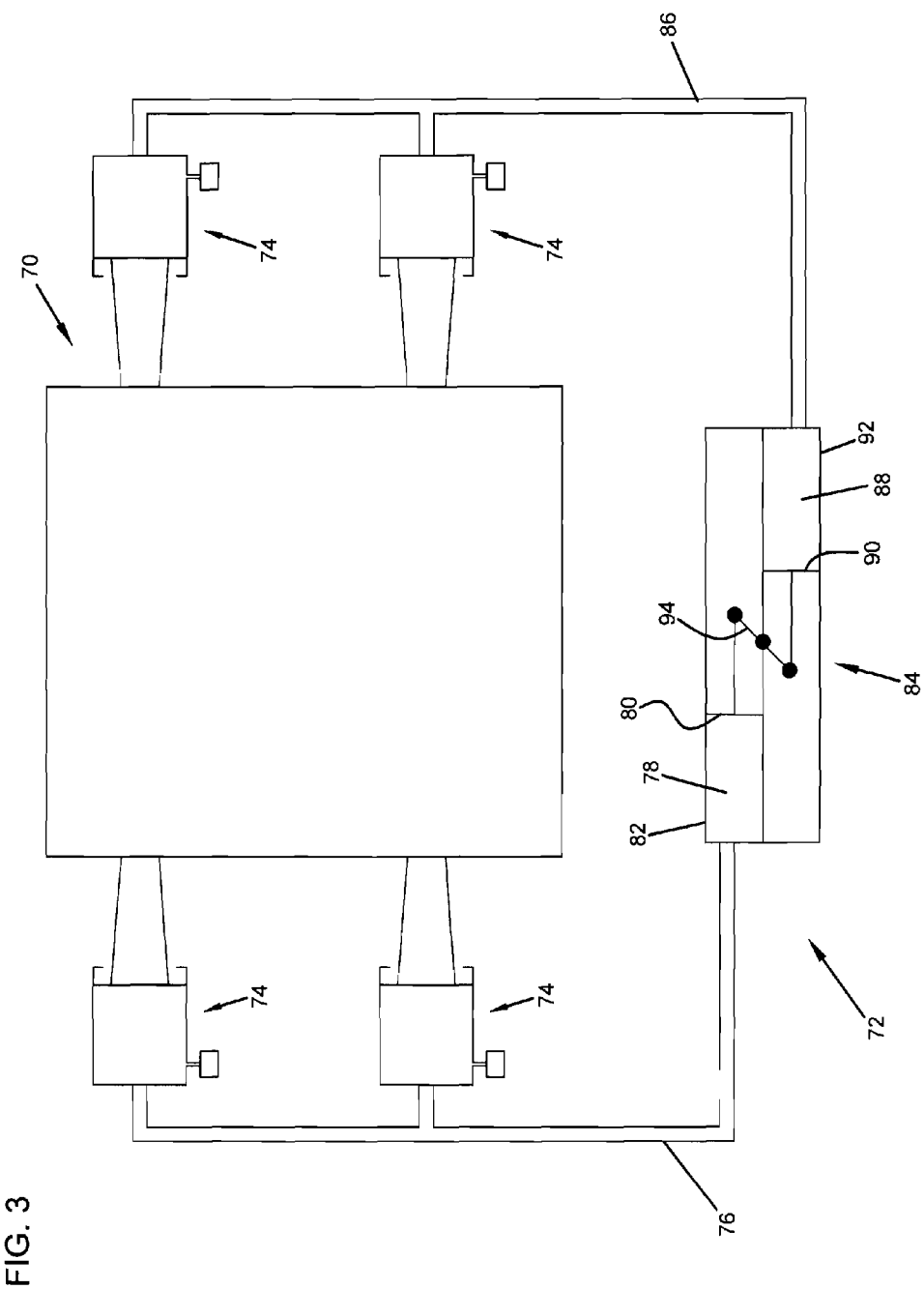
FIG. 3 illustrates another example of a shock load isolation mounting system described herein.

FIG. 3 illustrates an example of a shock load isolation mounting system 70 that is similar to the system in FIG. 1 including the use of shock load isolation mounts with shock mount portions and dashpots, but utilizes a fluid system 72 connected to cylinders 74 of the dashpots forming a fluid control system for the dashpots. The fluid system 72 includes a first fluid section 76 fluidly connected to the cylinders 74 on the left in FIG. 3 and to a fluid chamber 78 defined in a first piston 80 and cylinder 82 assembly of a control section 84. The fluid system 72 also includes a second fluid section 86 fluidly connected to the cylinders 74 on the right in FIG. 3 and to a fluid chamber 88 defined in a second piston 90 and cylinder 92 assembly of the control section 84.

A pivoting linkage 94 interconnects the piston 80 and the piston 90 such that as the volume of one fluid chamber 78, 88 changes, the other fluid chamber 78, 88 changes a corresponding amount. In use, upon occurrence of a large shock event that causes the volume of the cylinders 74 on the left in FIG. 3 to be reduced, fluid is discharged through the first fluid section 76 into the fluid chamber 78 which acts on the piston 80 to increase the volume of the chamber 78. The motion of the piston 80 is transmitted to the piston 90 via the linkage, causing the fluid chamber 88 to increase in volume which draws fluid from the cylinders 74 on the right via the second fluid section 86. This creates a force on the right side shock isolation mounts to resist the deflection of the object to the left during the shock event.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system, comprising:
an object subject to shock loads;
a plurality of shock load isolation mounts connected to the object, each shock load isolation mount includes:
an elastomeric shock mount portion having a first end fixed to the object, a second end, and an intermediate section between the first end and the second end, the elastomeric shock mount portion being deformable in compression, tension and shear; and
a dashpot mounted in series with the elastomeric shock mount portion, the dashpot includes a moveable piston and a cylinder that receives the piston therein, the piston is fixed to the second end of the elastomeric shock mount portion, and the cylinder is fixed to a support that is fixed relative to the object, and the dashpot provides damping in directions parallel to the compression and tension directions; and
a fluid system connected to the cylinders of the dashpots of the shock load isolation mounts; the fluid system including a first fluid section connected to a first one of the cylinders and second fluid section connected to a second one of the cylinders, and a control section having a first piston and cylinder assembly connected to the first fluid section and a second piston and cylinder assembly connected to the second fluid section.

2. The system of claim 1, wherein the object comprises electronics equipment, and the support comprises one or more walls of a cabinet that houses the electronics equipment.

3. The system of claim 2, comprising a plurality of the shock load isolation mounts connected to sides of the electronics equipment.

4. A system, comprising:
an object subject to shock loads;
a plurality of shock load isolation mounts connected to the object, each shock load isolation mount includes:
an elastomeric shock mount portion having a first end fixed to the object, a second end, and an intermediate section between the first end and the second end the elastomeric shock mount portion being deformable in compression, tension and shear; and
a dashpot mounted in series with the elastomeric shock mount portion, the dashpot includes a moveable piston and a cylinder that receives the piston therein, the piston is fixed to the second end of the elastomeric shock mount portion, and the cylinder is fixed to a support that is fixed relative to the object, and the dashpot provides damping in directions parallel to the compression and tension directions;
the intermediate section of each elastomeric shock mount portion extends through an opening formed in the respective cylinder and the first end is disposed outside of the cylinder.

5. The system of claim 4, wherein the opening is sized to permit shear movements of the intermediate section.

6. A shock load isolation mounting system for electronics equipment needing shock load isolation, comprising: a plurality of shock load isolation mounts connected to the electronics equipment, each shock load isolation mount includes: a shock mount portion having a first end fixed to the electronics equipment, a second end, and an intermediate section between the first end and the second end, the shock mount portion being deflectable in any direction; and a dashpot mounted in series with the shock mount portion, the dashpot includes a moveable piston and a cylinder that receives the piston therein, the intermediate section of the shock mount portion extends through an opening formed in the cylinder and the first end is disposed outside of the cylinder, the piston is fixed to the second end of the shock mount portion, and the cylinder is fixed relative to the electronics equipment, and the dashpot provides damping in directions parallel to compression and tension directions of the shock mount portion, further comprising a fluid system connected to the cylinders of the dashpots of the shock load isolation mounts; the fluid system including a first fluid section connected to a first one of the cylinders and second fluid section connected to a second one of the cylinders, and a control section having a first piston and cylinder assembly connected to the first fluid section and a second piston and cylinder assembly connected to the second fluid section.

7. The shock load isolation mounting system of claim 6, wherein the cylinder is fixed to a wall of a cabinet that houses the electronics equipment.

8. The shock load isolation mounting system of claim 6, comprising a plurality of the shock load isolation mounts connected to sides of the electronics equipment.

9. The shock load isolation mounting system of claim 6, wherein the opening is sized to permit lateral deflections of the intermediate section in directions perpendicular to the compression and tension directions.

10. The shock load isolation mounting system of claim 6, wherein the shock mount portion of each shock load isolation mount comprises an elastomeric element, a coil spring, or a wire rope spring.

* * * * *